No. 852,659. PATENTED MAY 7, 1907.
R. FALTER.
BRAKE.
APPLICATION FILED MAR. 20, 1906.

WITNESSES:
James F. Duhamel
Geo. S. Vashon

INVENTOR
Richard Falter
BY
W. H. Crichton-Clarke
ATTORNEY

UNITED STATES PATENT OFFICE.

RICHARD FALTER, OF NEW YORK, N. Y.

BRAKE.

No. 852,659.  Specification of Letters Patent.  Patented May 7, 1907.

Application filed March 20, 1906. Serial No. 307,043.

*To all whom it may concern:*

Be it known that I, RICHARD FALTER, a citizen of the United States, residing at New York, in the county of New York and State of New York, have invented new and useful Improvements in Brakes, of which the following is a specification.

This invention relates to a mechanical movement such as is intended particularly for use as a brake, although it can be used for other purposes if desired.

The object of the invention is to provide a strong, simple, durable and inexpensive device of the character specified.

The invention consists of the combination and arrangement of parts as well as the details of construction hereinafter described and claimed.

Figure 2:
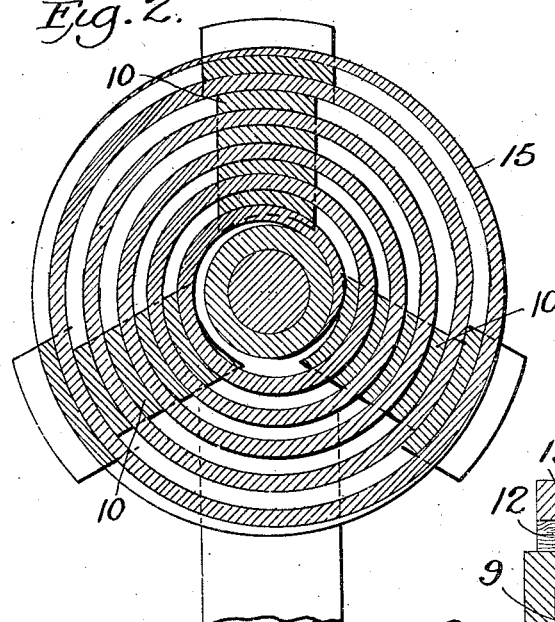
Figure 4:
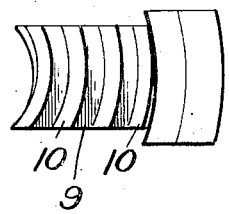
Figure 3:
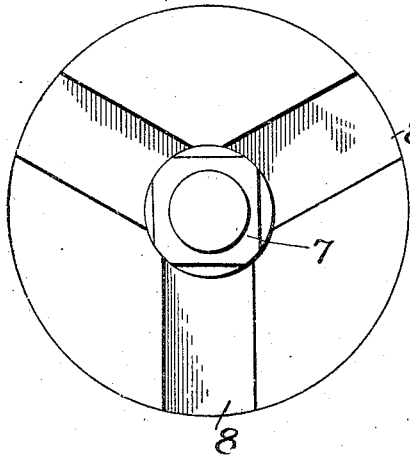
Figure 1:
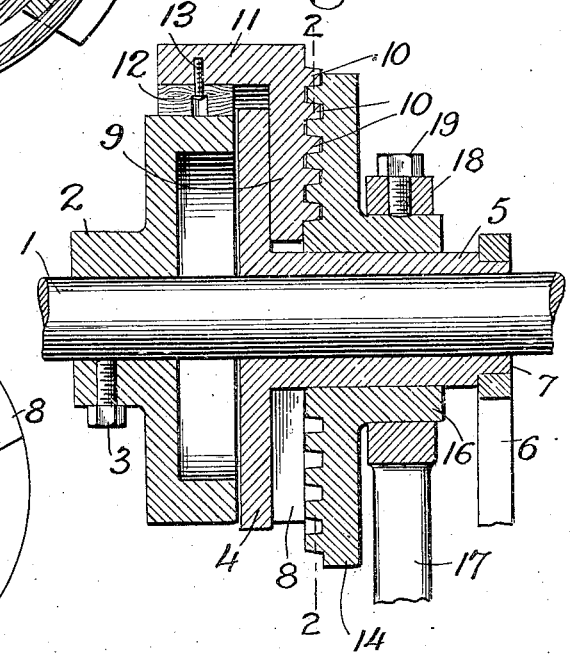

In the accompanying drawing forming part of this specification: Figure 1 is a horizontal, longitudinal section, partly in elevation, through a device constructed in accordance with the present invention. Fig. 2 is a section on the line 2—2 of Fig. 1. Fig. 3 is a detail view of the radially slotted disk. Fig. 4 is a detail view of one of the slidable members.

Like reference numerals indicate corresponding parts in the different figures of the drawing.

The reference numeral 1 indicates a suitable rotary member, such as a shaft or a vehicle wheel, to which it is necessary to apply a braking action at suitable intervals. The numeral 2 indicates a friction cup which is rigidly secured upon the shaft or rotary member 1 so as to rotate therewith. The preferred means for securing the friction cup 2 upon the rotary member 1 consists of a tightening screw 3.

The numeral 4 indicates a disk which preferably is formed integral with a sleeve 5, which loosely surrounds the rotary member 1, and is held stationary in any suitable manner, so as not to rotate with the member 1. The preferred means for holding the disk 4, and sleeve 5, stationary, consists of an arm 6, which may be of any suitable construction adapted to engage a squared portion 7, formed on the end of the sleeve 5, as shown in Fig. 3, and thus hold the sleeve against rotation. The disk 4 is formed with a plurality of radial slots 8, preferably three in number. Mounted to slide radially outward or inward in each of the slots 8 is a slidable member 9, which is formed with a plurality of lugs or projections 10, and with an angular extension 11, at its outer end. The angular extensions 11, of the three slidable members 9, preferably project over the periphery of the friction cup 2, as shown in Fig. 1, and are each provided with a suitable brake block or shoe, such as 12. Each of the brake shoes 12 is removably secured to the extension 11, in any suitable manner, such, for example, as by a screw 13, so that it can be replaced by a new shoe whenever it becomes worn.

Rotatably or loosely surrounding the non-rotary sleeve 5, is a disk or member 14, which is formed with a volute or coiled thread 15, as shown in Fig. 2, and with a sleeve or hub 16, as shown in Fig. 1. The threaded member or disk 14, is adapted to be slightly rotated in one direction or the other in any suitable manner whenever it is desired to apply or release the brake. The preferred means for partially rotating the disk 14, consists of a suitable brake lever 17, which is formed with a collar 18, surrounding the hub 16, of the threaded member 14. The collar 18, is rigidly secured to the hub 16, in any suitable manner such for example as by a screw 19. It will be observed that the lugs 10, on the slidable members 9, project between the threads of the disk 14.

Constructed as described, the device operates as follows: Let it be supposed that the shaft as member 1, and the friction cup 2, secured thereon are rotating. The sleeve 5 and slotted disk 4, are held stationary by the arm 6, and the threaded disk 14 is normally stationary. Whenever it is desired to apply a braking action to the friction cup 2, and member 1, the lever 17, is operated so as to cause the threaded disk 14, to rotate with relation to the stationary slotted disk 4, whereby the slidable members 9, are moved radially inward and the brake shoes 12 are pressed against the friction cup 2, so as to retard the rotation thereof. Movement of the lever 17, in the opposite direction, serves to release the brakes.

Changes in the precise construction shown and described may be made within the scope of the following claims without departing from the spirit of the invention or sacrificing any of its advantages.

What I claim is:

1. In a brake, the combination of a rotatable element having an engaging surface, a disk provided with a guide, a threaded disk, a slidable member controlled by said guide and in engagement with the threaded disk, said member having means adapted to engage the engaging surface of the rotatable element.

2. In a brake, the combination of a rotatable element having an engaging surface, a fixed element having a guide, a brake-shoe movable toward and away from said engaging surface and controlled in its movement by said guide, and a rotatable disk having a thread in engagement with said shoe to move the latter and means to rotate the rotatable disk.

3. In a brake the combination of a friction member, a slotted disk, a threaded disk, and a plurality of slidable members mounted in the slotted disk and being in engagement with the threaded disk, said slidable members having means adapted to engage the friction member.

4. In a brake the combination of a disk having radial slots, a plurality of slidable members mounted in the radial slots, a second disk having threads in engagement with the slidable members, and brake shoes connected with the slidable members.

5. In a brake, the combination of a friction member, a disk having radial slots, a plurality of slidable members mounted in said slots and having angular extensions, brake shoes on the angular extensions, a second disk having a thread in engagement with the slidable members, and means for operating the second disk.

6. In a brake, the combination of a rotary member having a friction member thereon, a stationary disk having radial slots, slidable members mounted in said radial slots and having angular extensions provided with brake shoes adapted to engage the friction member, a rotatable disk having a thread in engagement with the slidable members, and a device for operating the rotatable disk, substantially as described.

In testimony whereof, I have signed my name to this specification in the presence of two subscribing witnesses, this 14th day of March, 1906.

RICHARD FALTER.

Witnesses:
FRANK E. PURCELL,
W. H. CRICHTON-CLARKE.